(12) United States Patent
Schneider

(10) Patent No.: US 12,221,993 B2
(45) Date of Patent: *Feb. 11, 2025

(54) SCREW WITH AXIAL THREAD PLAY

(71) Applicant: Hilti Aktiengesellschaft, Schaan (LI)

(72) Inventor: Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 174 days.

This patent is subject to a terminal disclaimer.

(21) Appl. No.: 17/764,353

(22) PCT Filed: Oct. 20, 2020

(86) PCT No.: PCT/EP2020/079421
§ 371 (c)(1),
(2) Date: Mar. 28, 2022

(87) PCT Pub. No.: WO2021/083717
PCT Pub. Date: May 6, 2021

(65) Prior Publication Data
US 2022/0373016 A1  Nov. 24, 2022

(30) Foreign Application Priority Data
Oct. 31, 2019 (EP) .................................. 19206565

(51) Int. Cl.
*F16B 35/04* (2006.01)
*F16B 33/02* (2006.01)
(52) U.S. Cl.
CPC .................. *F16B 33/02* (2013.01)

(58) Field of Classification Search
CPC ................................. F16B 33/04; F16B 33/02
See application file for complete search history.

(56) References Cited

U.S. PATENT DOCUMENTS

| | | |
|---|---|---|
| 240,780 A | 4/1881 | Smith |
| 368,372 A | 8/1887 | Bingham |
| 556,082 A | 3/1896 | Boeddinghaus |
| 653,852 A | 7/1900 | Smith |
| 806,407 A | 12/1905 | Farrington |

(Continued)

FOREIGN PATENT DOCUMENTS

| | | |
|---|---|---|
| CN | 1957183 A | 5/2007 |
| CN | 101131174 A | 2/2008 |

(Continued)

OTHER PUBLICATIONS

International Search Report of PCT/EP2020/079421, dated Jan. 18, 2021.

(Continued)

*Primary Examiner* — Gary W Estremsky
(74) *Attorney, Agent, or Firm* — Davidson Kappel LLC

(57) ABSTRACT

A screw including a shank having a tip, a rear end, which is located opposite the tip, and a longitudinal axis, which extends through the tip and through the rear end, and a screw thread helix, which is arranged on the shank, wherein the screw thread helix has a screw thread ridge for engaging into an internal screw thread groove. The screw thread helix has axial tipward play with respect to the shank, wherein the tipward play increases as the axial distance of the screw thread helix from the tip increases.

18 Claims, 2 Drawing Sheets

(56) References Cited

U.S. PATENT DOCUMENTS

| | | |
|---|---|---|
| 1,005,630 A | 10/1911 | Fleming |
| 1,199,624 A | 9/1916 | Smith, Jr. |
| 1,802,668 A | 4/1931 | Newton |
| 2,091,788 A | 8/1937 | Mcmanus |
| 2,354,810 A | 8/1944 | Haas |
| 2,407,879 A | 9/1946 | Haas |
| 2,520,232 A | 8/1950 | Bohdan et al. |
| 2,520,323 A | 8/1950 | Miles et al. |
| 2,524,480 A | 10/1950 | Schenk |
| 2,563,976 A * | 8/1951 | Torosian ............... F16B 5/0266 248/231.21 |
| 3,165,136 A | 1/1965 | Horton |
| 3,373,647 A | 3/1968 | Sherock |
| 3,390,711 A | 7/1968 | Wilcox |
| 3,515,027 A | 6/1970 | Textrom |
| 3,967,525 A | 7/1976 | Lerich |
| 4,040,326 A | 8/1977 | Breed |
| 4,076,064 A | 2/1978 | Holmes |
| 4,536,115 A * | 8/1985 | Helderman ........... B25B 27/143 411/397 |
| 4,652,194 A | 3/1987 | Tajima et al. |
| 4,842,464 A | 6/1989 | Green |
| 4,861,206 A | 8/1989 | Riedel |
| 4,956,888 A | 9/1990 | Green |
| 5,086,532 A | 2/1992 | Green |
| 5,312,214 A * | 5/1994 | Morton .................... F16B 37/12 411/324 |
| 5,366,328 A * | 11/1994 | Helderman ........... F16B 33/004 411/17 |
| 5,569,009 A | 10/1996 | Suzuki |
| 5,674,035 A | 10/1997 | Hettich |
| 5,772,375 A | 6/1998 | Paterson |
| 5,779,416 A * | 7/1998 | Sternitzky ............. F16B 35/041 411/938 |
| 5,957,646 A | 9/1999 | Giannuzzi |
| 5,961,266 A | 10/1999 | Tseng |
| 6,276,883 B1 * | 8/2001 | Unsworth ............... F16B 37/12 411/16 |
| 6,494,657 B2 * | 12/2002 | Unsworth ........... F16B 25/0031 411/16 |
| 6,494,659 B1 * | 12/2002 | Lutkus .................... F16B 37/12 411/438 |
| 6,514,257 B2 | 2/2003 | Dovesi |
| 6,599,072 B1 | 7/2003 | Gerhard |
| 6,672,813 B1 | 1/2004 | Kajita |
| 6,835,036 B2 * | 12/2004 | Paul .................... F16B 13/0883 411/16 |
| 6,860,691 B2 | 3/2005 | Unsworth |
| 6,976,818 B2 | 12/2005 | Levey |
| 7,441,980 B2 * | 10/2008 | Leitermann ............. F16B 5/025 267/180 |
| 7,935,138 B1 * | 5/2011 | Richelsoph .......... A61B 17/863 606/313 |
| 8,182,186 B2 | 5/2012 | Huber |
| 8,322,960 B2 | 12/2012 | Gong |
| 8,430,617 B2 | 4/2013 | Hettich |
| 8,485,769 B2 | 7/2013 | Rosenkranz |
| 8,944,734 B2 | 2/2015 | Su |
| 9,517,519 B2 * | 12/2016 | Hagel ................. F16B 25/0026 |
| 2001/0014263 A1 | 8/2001 | Giannakakos |
| 2001/0053317 A1 | 12/2001 | Unsworth |
| 2002/0114682 A1 | 8/2002 | Forster |
| 2003/0049096 A1 | 3/2003 | Giannakakos |
| 2003/0190213 A1 | 10/2003 | Lutkus |
| 2004/0175251 A1 | 9/2004 | Paul |
| 2004/0258502 A1 | 12/2004 | Unsworth |
| 2005/0191150 A1 | 9/2005 | Bickford |
| 2006/0269380 A1 | 11/2006 | Yin-Feng |
| 2006/0285940 A1 | 12/2006 | Walther |
| 2007/0269287 A1 | 11/2007 | Runge |
| 2008/0014047 A1 | 1/2008 | Dohi |
| 2008/0050198 A1 | 2/2008 | Ayrle et al. |
| 2008/0181746 A1 | 7/2008 | Reiter et al. |
| 2009/0110513 A1 | 4/2009 | Gahn |
| 2009/0142161 A1 | 6/2009 | Hettich |
| 2010/0221087 A1 | 9/2010 | Gillis |
| 2010/0247267 A1 | 9/2010 | Bianchi et al. |
| 2010/0290858 A1 | 11/2010 | Hettich |
| 2011/0142569 A1 | 6/2011 | Hagel |
| 2011/0144703 A1 | 6/2011 | Krause |
| 2011/0164944 A1 | 7/2011 | Hughes |
| 2011/0286814 A1 | 11/2011 | Hettich |
| 2013/0058735 A1 | 3/2013 | Yu |
| 2013/0259599 A1 * | 10/2013 | Benjamin ............... F16B 33/02 411/366.1 |
| 2013/0302110 A1 | 11/2013 | Park |
| 2013/0336744 A1 | 12/2013 | Phua et al. |
| 2014/0023453 A1 | 1/2014 | Hollensen |
| 2014/0286728 A1 | 9/2014 | Park |
| 2015/0322990 A1 | 11/2015 | Langewiesche et al. |
| 2016/0003284 A1 | 1/2016 | Neumaier |
| 2016/0102697 A1 | 4/2016 | Goettlich |
| 2016/0252117 A1 | 9/2016 | Stastny |
| 2016/0305463 A1 | 10/2016 | Hargis |
| 2017/0021410 A1 | 1/2017 | Stumpf |
| 2017/0135737 A1 | 5/2017 | Krause |
| 2018/0106287 A1 | 4/2018 | Eckert |
| 2018/0266468 A1 * | 9/2018 | Kury .................... F01D 25/162 |
| 2018/0283435 A1 | 10/2018 | Hakenholt et al. |
| 2019/0219090 A1 | 7/2019 | Stager et al. |
| 2022/0389950 A1 | 3/2022 | Schneider et al. |
| 2022/0352735 A1 | 8/2022 | Schneider |

FOREIGN PATENT DOCUMENTS

| | | |
|---|---|---|
| CN | 104179770 A | 12/2014 |
| CN | 109139657 A | 1/2019 |
| DE | 202005015860 U1 | 12/2005 |
| DE | 102015103015 | 9/2016 |
| EP | 0228269 A2 | 7/1987 |
| EP | 0243526 A1 | 11/1987 |
| EP | 1457689 A2 | 9/2004 |
| EP | 2878739 A1 | 6/2015 |
| EP | 3736458 A1 | 11/2020 |
| EP | 20190172762 | 11/2020 |
| GB | 2163510 A | 2/1986 |
| TW | I350346 B | 10/2011 |
| TW | 201632743 A | 9/2016 |
| WO | WO-2007009286 A | 1/2007 |

OTHER PUBLICATIONS

Li, Y., Patil, S., Winkler, B., & Neumaier, T. (2013), "Numerical analysis of screw anchor for concrete", in Proc., FraMCoS-8, VIII International Conference on Fracture Mechanics of Concrete and Concrete Structures.

* cited by examiner

SCREW WITH AXIAL THREAD PLAY

The invention relates to a screw with a shank having a tip, a rear end, which is located opposite the tip, and a longitudinal axis, which extends through the tip and through the rear end, and a screw thread helix, which is arranged on the shank, wherein the screw thread helix has a screw thread ridge for engaging into an internal screw thread groove.

BACKGROUND

US2010/0247267 A1 discloses concrete screws, i.e. screws that can be tappingly screwed into a borehole in a concrete substrate. The screws of US2010/0247267 A1 are monolithic.

US2018/0283435 A1 discloses a concrete screw that has a screw thread helix which is separate from the shank. The screw thread helix is located in a helical screw thread helix receiving groove, which is provided within the shank. The groove has an inclined rearwardly facing wedge flank. The groove also has an inclined forwardly facing flank, but in contrast to the rearwardly-facing flank, the forwardly facing flank is relatively steep.

European patent application number 19172762.7, now published as EP3736458 A1 on Nov. 11, 2020, also relates to a concrete screw having a separate screw thread helix. In this case, it is proposed to provide the screw thread helix with slots, which are intended to facilitate radial expansion.

LI, Y., PATIL, S., WINKLER, B., & NEUMAIER, T. (2013), "Numerical analysis of screw anchor for concrete", in Proc., FraMCoS-8, VIII International Conference on Fracture Mechanics of Concrete and Concrete Structures, mentions that combined concrete breakout and shear failure can be a typical failure mode of concrete screws. Concrete breakout originates along the shank, and shear failure of the remainder of the system then occurs between the concrete breakout region and the screw tip.

SUMMARY OF THE INVENTION

It is an object of the invention to provide a screw, in particular a concrete screw, which has, whilst being easy to manufacture, particularly high performance and/or which has particularly good reliability and/or versatility.

The present invention provides a screw comprising a shank (10) having a tip (11), a rear end (18), which is located opposite the tip (11), and a longitudinal axis (99), which extends through the tip (11) and through the rear end (18), and a screw thread helix (20), which is arranged on the shank (10), wherein the screw thread helix (20) has a screw thread ridge (28) for engaging into an internal screw thread groove characterized in that the screw thread helix (20) has axial tipward play with respect to the shank (10), wherein the tipward play increases as the axial distance of the screw thread helix (20) from the tip (11) increases.

A screw according to the invention allows that axial engagement of more rearwardly located sections of the screw thread helix by the shank is delayed when the shank is rearwardly loaded within the screw thread helix.

In connection with the invention, it was found that with conventional concrete screws, in which the screw thread ridge is rigidly connected to the shank, substrate regions located relatively high in the borehole, i.e. near the mouth of the borehole, can tend to be become relatively highly loaded, whereas regions located deeper within the borehole are loaded at lower level, when the shank of the screw is loaded axially rearwardly, i.e. in the pull-out direction. This inhomogeneous loading behaviour can be related to the difference in stiffness between the screw shank steel (having higher Young's modulus of about 210 GPa) and concrete (having lower Young's modulus of about 30-40 GPa). Due to the inhomogeneous loading behaviour, however, the local concrete capacity at upper regions of the borehole might be already reached at relatively low screw loads, potentially leading to pre-damaging. In particular, this might lead to premature concrete cone failure, with a concrete cone originating relatively high in the borehole, at a significant distance from the tip of the shank, and consequent failure of the remaining screw engagement near the tip, which is then exposed to the full load (for example by shearing-off the concrete consoles between the screw thread). In this case, the connection is not fully utilizing the concrete capacity available near the tip.

It is now proposed to provide the screw thread ridge, which is intended to screwingly engage the borehole wall, on a screw thread helix which is separate from the screw shank. This separate screw thread helix is arranged on the shank in such a way that the screw thread helix (and therefore also the screw thread ridge) have axial play towards the tip with respect to the shank. Accordingly, there is provided space so that these elements can move essentially freely with respect to the shank towards the tip by a certain axial distance. This axial play increases towards the rear end of the shank.

Accordingly, there is provided axial play directed towards the tip between the screw thread ridge on the one hand and the shank on the other hand. Due to this forward axial play, the screw thread helix carrying the screw thread ridge has to first travel some axial distance to overcome the axial play, before it axially abuts against the shank. The axial play increases with increasing distance from the tip and decreasing distance from the rear end of the shank. Accordingly, when the shank is axially loaded in the rearward direction, axial engagement of the screw thread helix (including the screw thread ridge) by the shank occurs, first and foremost, close to the tip, whereas sections of the screw thread helix which are located closer to the rear end of the shank (i.e. closer to the loaded end of the shank) are not yet axially engaged by the shank during initial loading. Consequently, during initial axial loading of the screw, loads between the screw and the surrounding substrate are transferred only at those sections of the screw thread helix which are located close to the screw tip. Since no significant loads are initially transferred in the upper sections of the screw thread helix, pre-damaging of upper concrete regions can be avoided.

When tensile rearward load is increased, concrete surrounding the screw gets deformed due to its relatively low stiffness compared to the shank. As a consequence, more rearwardly located regions of the screw thread helix get progressively into axial engagement with the shank, so that more rearwardly located regions of the screw thread helix, i.e. regions located closer to the rear end, become axially loaded. Hence, the load transfer starts near the tip of the shank and is progressively extended to larger regions of the screw thread helix, towards the rear end of the shank. Providing rearwardly—increasing forward axial play to the screw thread helix, with respect to the shank, can thus, at least partly, reduce the difference in stiffness between the shank and the surrounding concrete substrate.

Accordingly, a concrete screw that provides particularly homogeneous, non-localized load transfer over its embedment can be achieved. In particular, concrete pre-damaging can be counteracted and/or the origin of concrete cone failure can be shifted deeper into the borehole, resulting in particularly good performance.

The tip is that end of the shank which is intended to be inserted first into the hole in the substrate when the screw is installed, i.e. it is the intended leading end. Preferably, the tip is a blunt tip. The rear end and the tip, respectively, are opposite ends of the shank. A head with a screw drive might be attached to the rear end. However, the screw might also have an internal screw drive located within the shank.

Throughout this document—wherever the terms "axially", "longitudinally", "radially" or "circumferentially" are used, this should, in particular, be meant with respect to the longitudinal axis of the shank. In particular, the thread axes of the screw thread helix and/or of the screw thread ridge can be arranged coaxial with the longitudinal axis of the shank. The screw thread helix, the screw thread ridge and/or, if present, the screw thread helix receiving groove preferably wind around the longitudinal axis. The shank can be generally cylindrical, at least in regions, in particular at least remote from the tip, wherein the cylinder axis is the longitudinal axis of the shank. The screw thread helix does not have to be strictly helical in the mathematical sense. The shank is arranged within the screw thread helix. The screw thread helix surrounds the shank and winds around the shank.

Where the term "rearwardly" is used, this should, in particular, refer to a direction pointing from the tip to the rear end, in particular parallel to the longitudinal axis of the shank.

In particular, the screw thread helix is separate from the shank, i.e. the screw thread helix and the shank are two distinct, non-monolithic items. The screw thread helix winds around the longitudinal axis of the shank, i.e. it turns completely or repeatedly about the longitudinal axis.

The screw thread ridge is tightly fixed to the remainder of the screw thread helix. In particular, the screw thread ridge and the remainder of the screw thread helix (which remainder can for example be a back of the screw thread helix) can be monolithic. The screw thread helix can be provided with expansion slots, which cut through the screw thread ridge and define adjacent expansion fingers held together by the back of the screw thread helix. In particular, the expansion slots can originate from the forward edge of the screw thread helix and extend axially into the screw thread helix. This can facilitate radial expansion of the screw thread helix. However, the screw thread ridge can also be continuous.

The screw thread ridge forms a protrusion on the screw. The screw thread ridge is provided to engage into an internal screw thread groove, in particular arranged in the wall of a borehole. As already hinted at above, the screw thread ridge can be continuous or non-continuous, for example if expansion slots cut through the screw thread ridge. If the screw thread ridge is non-continuous, it can comprise a plurality of separate protrusions, for example ribs, which are all arranged to engage into the single, common internal screw thread groove.

The screw thread helix having axial tipward play with respect to the shank in particular implies that the shank is able to axially rearwardly engage the screw thread helix, but that it can do so only after the screw thread helix has moved forwardly by a certain distance relative to the shank. The fact that there is play can imply that there is a predetermined length for unimpeded motion, but that this length is finite.

In particular the screw thread helix is arranged on the shank so as to transfer rearwardly directed tensile load from the shank into the screw thread helix. Accordingly, tensile load can be transferred from the shank into the substrate into which the screw thread ridge is screwed in. Preferably, the screw thread helix is attached to the shank, e.g. to prevent loosing of the screw thread helix.

The screw thread helix can have additional elements attached thereto, either monolithically or non-monolithically, for example a screw thread helix extension for fixing an end of the screw thread helix to the tip of the shank.

It is particularly preferred that the shank has a rearwardly facing flank for axially engaging the screw thread helix. This rearwardly facing flank forms an abutment for the screw thread helix. Transfer of rearwardly directed tensile load from the shank into the screw thread helix can be accomplished at the rearwardly facing flank. This can provide a mechanism that is particularly easy to manufacture, whilst being high-performing. In particular, the rearwardly facing flank can wind around the longitudinal axis of the shank and/or can be helical. The rearwardly facing flank is preferably continuous. However, it could also have interruptions. In particular, the rearwardly facing flank faces towards the rear end of the shank.

Preferably, a gap, which is flanked by the screw thread helix and by the rearwardly facing flank, is provided between the screw thread helix and the rearwardly facing flank, wherein the gap becomes wider, in particular axially wider, as the axial distance of the adjacent screw thread helix from the tip increases. This gap can define the axial play, preferably, in a particularly easy-to-manufacture and high-performing manner.

The rearwardly facing flank could be arranged generally perpendicular to the longitudinal axis for tight engagement of the screw thread helix. According to a preferred embodiment, however, the rearwardly facing flank is a wedge flank for radially loading the screw thread helix as the shank is loaded rearwardly. In particular, the wedge flank can enclose an acute flank angle with the longitudinal axis, the flank angle being open towards the tip. Accordingly, the screw thread helix will be forced radially outwards, away from the longitudinal axis of the shank, where the screw thread helix is axially pushed against the rearwardly facing flank. This can provide particularly high performance, in particular in dynamic load situations and/or in cracked concrete. Due to the axial play, the sections of the screw thread helix which are located close to the tip of the shank will be radially loaded first when the shank is axially rearwardly loaded, whereas sections located closer to the rear end of the shank can remain radially unloaded. Only when the axial loading of the shank increases, sections located closer to the rear end of the shank will also become radially loaded. Since the wedge flank winds around the shank, and since it encloses an acute flank angle with the longitudinal axis, it could also be considered a cone face.

Advantageously, a screw thread helix receiving groove that winds around the longitudinal axis of the shank is provided in the shank, the screw thread helix is arranged in the screw thread helix receiving groove, and the rearwardly facing flank delimits the screw thread helix receiving groove. This can provide a particularly robust and yet easy-to-manufacture screw. The screw thread helix receiving groove can be generally helical. The screw thread ridge can protrude radially over the screw thread helix receiving groove.

It is particular preferred that, where the screw thread helix receiving groove accommodates the screw thread helix, the width of the screw thread helix receiving groove increases as the axial distance of the screw thread helix receiving groove from the tip increases, i.e. as it approaches the rear end of the shank. Providing the screw thread helix receiving groove with variable width can be a particularly easy-to-manufacture and yet reliable way of providing variable play for the screw thread helix, for example since the width of the screw thread helix receiving groove can be relatively easily controlled in a rolling or cutting process. The width of the screw thread helix receiving groove increases at least where the screw thread helix receiving groove accommodates the screw thread helix. Further to the rear, the width of the screw thread helix receiving groove can again decrease, for example to provide an end taper, which can be advantageous in view of manufacturing and/or to avoid prominent edges. The width of the screw thread helix receiving groove can in particular be measured parallel to the longitudinal axis of the shank.

It is particular preferred that, where the screw thread helix receiving groove accommodates the screw thread helix, the width of the screw thread helix receiving groove increases by at least 5% and/or by a maximum of 20% as the axial distance of the screw thread helix receiving groove from the tip increases. This provides reliable functioning whilst being easy to manufacture.

According to another preferred embodiment of the invention, the shank has, at the screw thread helix receiving groove, a tipwardly facing flank, wherein the screw thread helix abuts against the tipwardly facing flank. Accordingly, the tipwardly facing flank can keep the screw thread helix in position during screwing-in of the screw, and can do so in a particular easy-to-manufacture and yet reliable manner. Preferably, the tipwardly facing flank (which faces towards the tip), can be arranged at a high flank angle with respect to the longitudinal axis of the shank, more preferably at an angle of about 90°. In particular, the tipwardly facing flank faces the rearwardly facing flank and both flanks delimit the screw thread helix receiving groove. In particular, the tipwardly facing flank can wind around the longitudinal axis of the shank and/or be helical.

The tipwardly facing flank has, advantageously, constant pitch (i.e. axial distance between adjacent threads), which can provide a particularly functional design.

According to another advantageous embodiment of the invention, the screw thread helix has constant ribbon width, i.e. constant width in the axial direction. This can further reduce manufacturing effort and provide a particularly efficient design.

The screw thread ridge can have, expediently, constant pitch (i.e. axial distance between threads). This can further improve functionality, for example by preventing premature consumption of the axial play.

Preferentially, the tipward play continuously increases as the axial distance of the screw thread helix from the tip increases. If the axial play is provided by the gap, the gap can become continuously wider, in particular in the axial direction, as the axial distance of the gap from the tip increases. Accordingly, the axial play or the gap, respectively, do not have discrete steps. This can for example be advantageous in view of homogenous force transfer and thus performance.

The screw thread helix can have axial tipward play with respect to the shank alongside a fraction of the screw thread helix only. Accordingly, a section of the screw thread helix that is close to the tip can be in contact with the rearwardly facing flank from the beginning, so as to be loaded as soon as the shank is rearwardly loaded. Alternatively, the screw thread helix could have axial tipward play with respect to the shank alongside all of screw thread helix, which would lead to an initial axial slack all along the screw thread helix.

The screw thread helix can have, preferentially, a helical back, wherein the screw thread ridge radially protrudes from the back, and wherein the back axially protrudes from the screw thread ridge towards the rear end of the shank. This back can increase design freedom and can, for example, allow to provide above-mentioned expansion slots within the screw thread helix.

Unless mentioned otherwise, the screw is described here in an unloaded state and/or pre-installation state, i.e. in a state before it is screwingly inserted into a corresponding borehole, which can in particular be a state where the screw is surrounded by ambient air throughout. Accordingly, unless mentioned otherwise, the screw thread ridge is free of any mating thread engagement and/or the screw is not externally loaded.

As already mentioned above, the axial tipward play may compensate effects arising from the difference in stiffness between the screw shank material and the surrounding substrate. Thus, the screw is preferably a concrete tapping screw, i.e. the screw, in particular the screw thread ridge thereof, is able to, at least partly, cut an internal mating screw thread in a concrete substrate. The shank is, preferably, a steel shank. Accordingly, it consists of steel, which might also be coated. Preferably, the shank is monolithic.

Preferably, the screw thread ridge consists of metal, more preferably steel, which might also be coated. More preferably the screw thread helix consists of metal, especially steel, which might also be coated.

BRIEF DESCRIPTION OF THE DRAWINGS

The invention is explained in greater detail below with reference to preferred exemplary embodiments, which are depicted schematically in the accompanying drawings. Individual features of the exemplary embodiments presented below can be implemented either individually or in any combination within the scope of the present invention.

DETAILED DESCRIPTION

Figure 1:
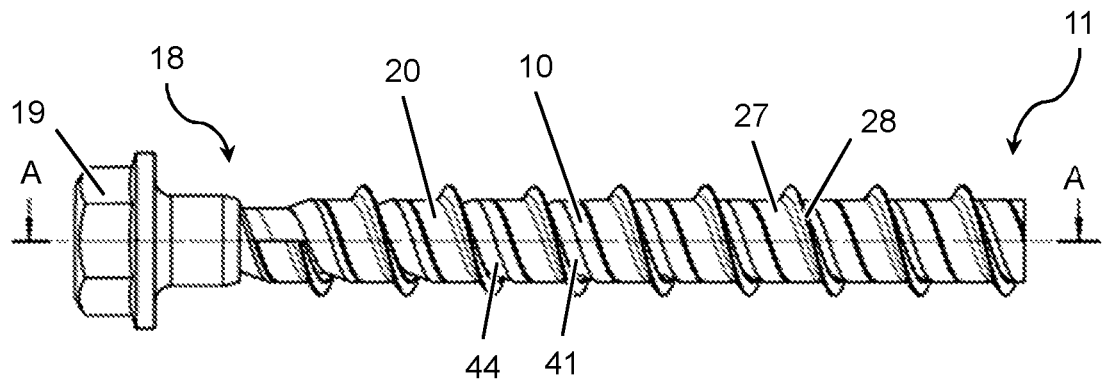
FIG. 1 is a side view of a screw in an unloaded state.

The figures show an embodiment of a screw. The screw comprises a shank 10 having a tip 11 at its front end, and, at its opposite other end, a rear end 18. The tip 11 is that end of the shank 10 which is intended to be inserted first into a borehole. The longitudinal axis 99 of the shank 10 extends through the tip 11 and through the rear end 18.

The screw further comprises a drive 19 for transmitting torque to the shank 10 for rotating the shank 10 around the longitudinal axis 99 of the shank 10 for installing the screw. In the present embodiment, the drive 19 is a hex drive head connected to the rear end 18. However, this is an example only, and any type of drive could be used, such as a slotted drive, a cruciform drive, a lobular drive, an internal polygon drive, an external polygon drive or a special drive.

The screw furthermore comprises a screw thread helix 20, wherein the screw thread helix 20 and the shank 10 are separate elements. Both the screw thread helix 20 and the shank 10 can consist of metal, preferably of steel.

The shank 10 is provided with a screw thread helix receiving groove 12, which winds around the shank 10 and around the longitudinal axis 99 of the shank 10. The screw thread helix 20 is positioned in this screw thread helix receiving groove 12.

The screw thread helix 20 is a ribbon, wherein the ribbon width $w_h$, of the ribbon, measured parallel to the longitudinal axis 99 of the shank 10, is preferably larger than the ribbon height of the ribbon, measured perpendicular to the longitudinal axis 99 of the shank 10. The screw thread helix 20 might have non-shown additional elements connected thereto, e.g. slanted end elements for avoiding sharp ends, or elements for positioning or fixing the screw thread helix 20 on the shank 10. These additional elements might be helical or non-helical, and/or integral or non-integral with the screw thread helix 20.

Figure 3:
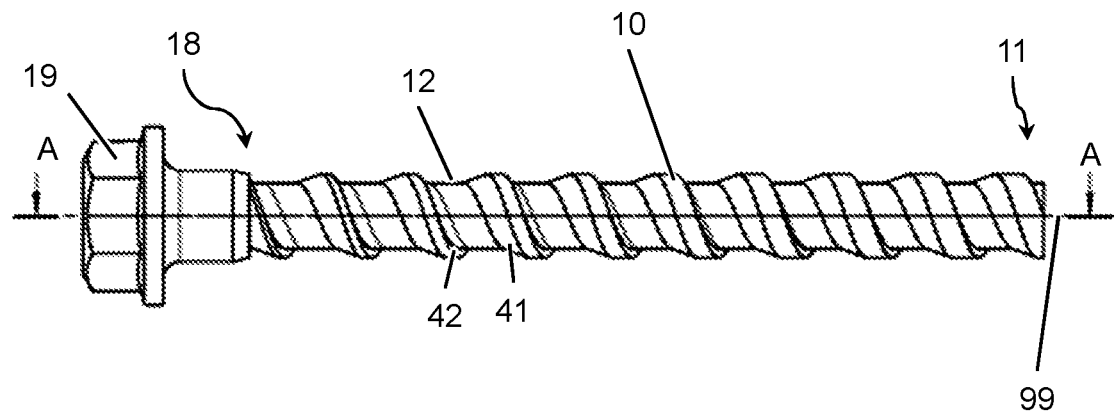
FIG. 3 is a side view of the screw of FIGS. 1 and 2, with the screw thread helix omitted, in an unloaded state.

The shank 10 has a rearwardly facing flank 41 and a tipwardly facing flank 42, which delimit opposite sides of the screw thread helix receiving groove 12 (see, e.g., FIG. 3). The rearwardly facing flank 41 and the tipwardly facing flank 42 border the screw thread helix receiving groove 12, and the screw thread helix receiving groove 12 is located between the rearwardly facing flank 41 and the tipwardly facing flank 42. When seen from a location within the screw thread helix receiving groove 12, the adjacent rearwardly facing flank 41 is located closer to the tip 11 than the adjacent tipwardly facing flank 42.

The rearwardly facing flank 41 thus faces rearwardly, away from the tip 11, whereas the tipwardly facing flank 42 faces forwardly, towards the tip 11. The rearwardly facing flank 41 encloses an acute angle with the longitudinal axis 99, e.g. an angle of about 20°. At the rearwardly facing flank 41, the radius of the shank 10 increases as the axial distance from the tip 11 decreases. When the shank 10 is loaded relative to the screw thread helix 20 rearwardly, in the pull-out direction, i.e. in the direction pointing from the tip 11 of the shank 10 to its rear end 18, the rearwardly facing flank 41 can wedge the screw thread helix 20 to force it radially outwards, away from the longitudinal axis 99. Accordingly, in the present embodiment, the rearwardly facing flank 41 is a wedge flank for radially loading the screw thread helix 20 as the shank 10 is loaded rearwardly. In order to facilitate radial expansion of the screw thread helix 20, not-shown expansion slots can be provided in the screw thread helix 20, for intentionally weakening the screw thread helix 20.

The tipwardly facing flank 42 includes a relatively high angle with the longitudinal axis 99. In the present embodiment, the tipwardly facing flank 42 is, by way of example, arranged approximately perpendicular to the longitudinal axis 99.

The screw thread helix 20 comprises a helical back 27 and a helical screw thread ridge 28, which protrudes radially outwardly from the back 27. The screw thread ridge 28 can engage into a single, common first internal thread groove provided in the wall of a borehole in a substrate, in particular a concrete or masonry substrate. The screw thread ridge 28 is arranged at the forward, i.e. tipward, edge of the screw thread helix 20, so that it can be wedged by the rearwardly facing flank 41. In the present embodiment, the screw thread ridge 28 is continuous. Alternatively, it could also be discontinuous and e.g. consist of a plurality of ribs. The helical back 27 can define a friction surface, which can frictionally act against the cylindrical borehole wall.

Figure 2:
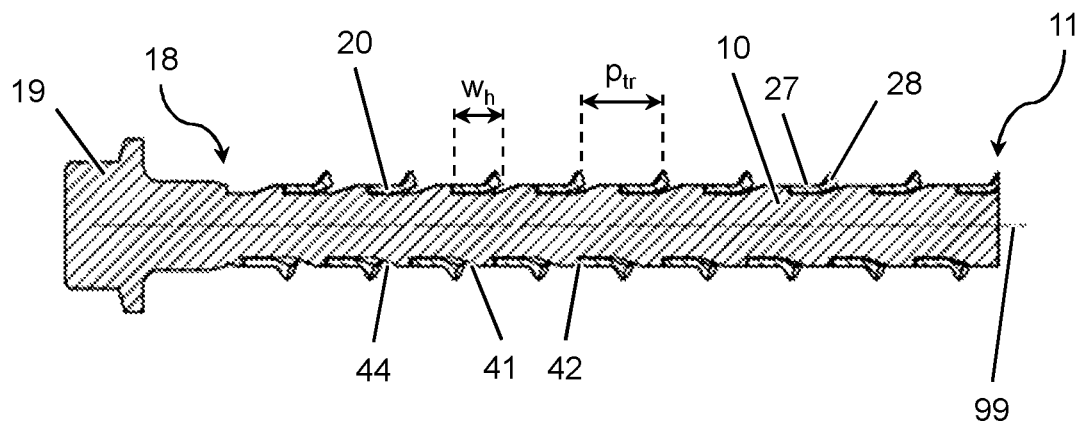
FIG. 2 is a sectional view, according to A—A in FIG. 1, of the screw of FIG. 1 in an unloaded state.

As can e.g. be taken from FIG. 2, the screw thread helix 20 has constant ribbon width $w_h$ throughout, with the ribbon width $w_h$, measured parallel to the longitudinal axis 99. In particular, the ribbon width $w_h$, can be considered to be the extent of the helically wound ribbon which forms the screw thread helix 20, measured parallel to the longitudinal axis 99.

As can e.g. be further taken from FIG. 2, the screw thread ridge 28 has constant pitch $p_{tr}$, i.e. distance between threads, throughout, with the pitch $p_{tr}$, measured parallel to the longitudinal axis 99. The pitch $p_t$, of the screw thread ridge 28 is equal to the pitch of the forward ribbon edge and/or to the pitch of the rearward ribbon edge of the screw thread helix 20.

The screw thread helix receiving groove 12 has a width $w_g$, measured parallel to the longitudinal axis 99. In particular, the width $w_g$ can be considered to be the extent parallel to the longitudinal axis 99 of the screw thread helix receiving groove 12, determined at the surface of the shank 10 which is interrupted by the screw thread helix receiving groove 12. In particular, the width $w_g$ is the axial distance between the foreward edge of the rearwardly facing flank 41 and the rearward edge of the tipwardly facing flank 42.

Figure 4:
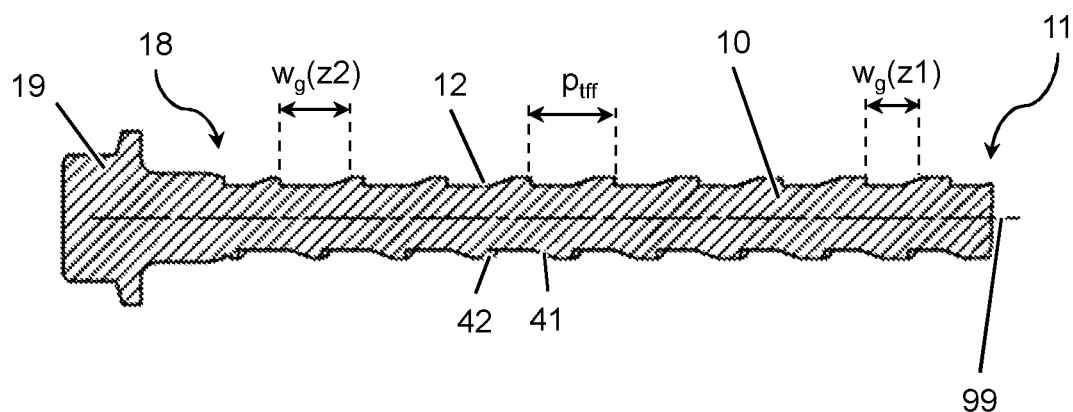
FIG. 4 a sectional view, according to A—A in FIG. 3, of the screw of FIGS. 1 to 3, with the screw thread helix omitted, in an unloaded state.

As can e.g. be taken from FIG. 4, the width $w_g$ varies in the region where the screw thread helix receiving groove 12 accommodates the screw thread helix 20. In particular, the width $w_g$ continuously increases towards the rear end 18 of the shank 10, i.e. the width $w_g$ continuously increases as the axial distance from the tip 11 increases, in the region where the screw thread helix receiving groove 12 accommodates the screw thread helix 20. Therefore, the width $w_g(z2)$ at location z2 is larger than the width $w_g(z1)$ at location z1, wherein z1 is, along the longitudinal axis 99, located closer to the tip 11 and farther from the rear end 18 than z2.

As can further be taken e.g. from FIG. 4, the tipwardly facing flank 42 has constant pitch $p_{tf}$, at least in the region where the screw thread helix receiving groove 12 accommodates the screw thread helix 20. Pitch $p_{tf}$ of the tipwardly facing flank 42 can for example be determined at the rearward edge of the tipwardly facing flank 42, which can also be the rearward edge of the screw thread helix receiving groove 12. Pitch is the distance between threads, determined parallel to the longitudinal axis 99.

Before installation, i.e. in the state shown in FIGS. 1 to 4, the screw thread helix 20 abuts, at the rearward edge of its ribbon, against the tipwardly facing flank 42 of the screw thread helix receiving groove 12 all along the screw thread helix 20. Since the ribbon width $w_h$, of the screw thread helix 20 is constant, whereas the width $w_g$ of the screw thread helix receiving groove 12 increases as the screw thread helix receiving groove 12 approaches the rear end 18 of the shank 10, a helical gap 44 is formed between the front edge of the screw thread helix 20 and the rearwardly facing flank 41, which gap 44 becomes wider as it approaches the rear end 18 of the shank 10. Due to the gap 44, the screw thread helix 20 has axial forward play on the shank 10, which axial play increases as the distance of the screw thread helix 20 from the rear end 18 decreases.

If the shank 10 is rearwardly loaded with respect to the screw thread helix 20 during installation or use of the screw, the threads of the screw thread helix 20 that are located closest to the tip 11 of the shank 10 will be axially loaded and radially displaced by the rearwardly facing flank 41 first, since their associated gap width is relatively small or zero from the beginning. On the other hand, threads of the screw thread helix 20 that are located further to the rear, have a wider associated gap 44 and thus a higher distance to travel before hitting the rearwardly facing flank 41, and consequently, they will become loaded and radially displaced by the rearwardly facing flank 41 only at higher loads, when deformation, in particularly of the substrate, becomes significant. This can lead to preferential load transfer starting deep within the borehole in which the screw is located, and progression of the load transfer up the borehole as the screw is becomes more highly loaded.

In use, the shank 10 of the screw is placed in a borehole in a substrate, in particular a concrete or masonry substrate, so that the screw thread ridge 28 of the screw thread helix 20 engages into an internal screw thread groove provided in the wall of the borehole. If the screw is a tapping screw, this internal screw thread groove can be cut by the screw itself, in particular by its screw thread helix 20, preferably by the screw thread ridge 28. In an alternative embodiment, the screw could, however, also be non-tapping—in this case, the internal screw thread groove could also be provided by a separate thread cutting tool.

Figure 5:
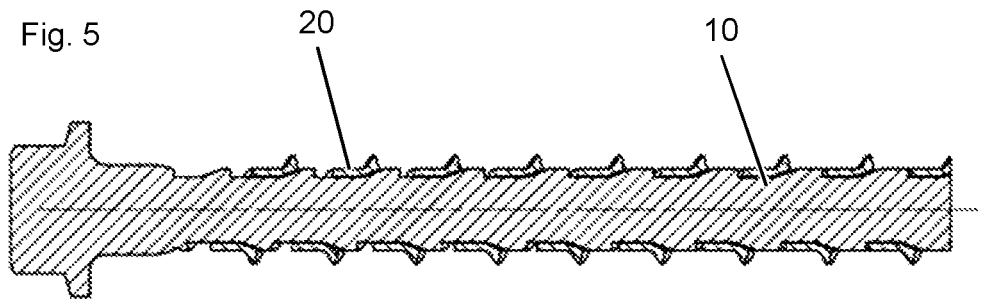
FIG. 5 is a sectional view of the screw of FIGS. 1 to 4, similar to that of FIG. 2, but in a highly loaded state.

The shank 10 is then loaded in the pull-out direction, i.e. away from the tip 11. This loading will cause the rearwardly facing flank 41 to engage and load the screw thread helix 20 axially rearwardly, and, since the rearwardly facing flank 41 is inclined, also radially outwardly, forcing the screw thread ridge 28 into the borehole wall of the borehole. Due to the varying width of the gap 44 between the front edge of the screw thread helix 20 and the rearwardly facing flank 41, said radial displacement will be initiated at the front end of screw thread helix 20, i.e. deep within the borehole. As the load of the shank 10 is increased, local deformation will occur in the vicinity of the screw. As a result of this deformation, regions of the screw thread helix 20 located closer to the rear end 18 of the shank 10 also overcome the gap 44 and get into axial contact with the rearwardly facing flank 41. As a consequence, load transfer propa-gates rearwards towards the mouth of the borehole as the shank 10 is loaded more and more strongly. FIG. 5 schematically illustrates a very high load situation, in which the shank 10 is so highly loaded that generally all of the gap 44 is closed and that generally all of the screw thread helix 20 abuts against the rearwardly facing flank 41. Due to the progressive load transfer mechanism, concrete loading can be much more homogeneous, in particular with concrete cone failure occurring at relatively deep embedment depths and at relatively high loads.

As can be taken from FIGS. 1 and 2, the tipward end region of the screw thread helix 20 abuts against the rearwardly facing flank 41 already from the beginning, i.e. the tipward end region, the screw thread helix 20 abuts against the rearwardly facing flank 41 also in an unloaded state of the screw. The gap 44 therefore does not reach into the tipward end region of the screw thread helix 20 and there is no axial play in the tipward end region of the screw thread helix 20. The gap 44 and the axial play are only provided further to the rear.

The invention claimed is:

1. A screw comprising:
   a shank having a tip, a rear end located opposite the tip, and a longitudinal axis extending through the tip and through the rear end; and
   a screw thread helix arranged on the shank and having a screw thread ridge for engaging into an internal screw thread groove;
   the screw thread helix having axial tipward play with respect to the shank, the tipward play increasing as an axial distance of the screw thread helix from the tip increases;
   wherein the screw is a concrete tapping screw, and the shank is a steel shank.

2. The screw as recited in claim 1 wherein the shank has a rearwardly facing flank for axially engaging the screw thread helix, and further comprising a gap between the screw thread helix and the rearwardly facing flank, wherein the gap becomes wider as the axial distance of the adjacent screw thread helix from the tip increases.

3. The screw as recited in claim 2 wherein the rearwardly facing flank is a wedge flank for radially loading the screw thread helix as the shank is loaded rearwardly.

4. The screw as recited in claim 2 further comprising a screw thread helix receiving groove winding around the longitudinal axis of the shank in the shank, the screw thread helix being arranged in the screw thread helix receiving groove, and the rearwardly facing flank delimiting the screw thread helix receiving groove.

5. The screw as recited in claim 4 wherein the screw thread helix receiving groove accommodates the screw thread helix, a width of the screw thread helix receiving groove increasing as the axial distance of the screw thread helix receiving groove from the tip increases.

6. The screw as recited in claim 5 wherein the screw thread helix receiving groove accommodates the screw thread helix, the width of the screw thread helix receiving groove increasing by at least 5% as the axial distance of the screw thread helix receiving groove from the tip increases.

7. The screw as recited in claim 4 wherein the shank has, at the screw thread helix receiving groove, a tipwardly facing flank, wherein the screw thread helix abuts against the tipwardly facing flank.

8. The screw as recited in claim 7 wherein the tipwardly facing flank has constant pitch.

9. The screw as recited in claim 1 wherein the screw thread helix has constant ribbon width.

10. The screw as recited in claim 1 wherein the screw thread ridge has constant pitch.

11. The screw as recited in claim 1 wherein the tipward play continuously increases as the axial distance of the screw thread helix from the tip increases.

12. The screw as recited in claim 1 wherein the screw thread helix has axial tipward play with respect to the shank alongside a fraction of the screw thread helix.

13. The screw as recited in claim 1 wherein the screw thread helix has axial tipward play with respect to the shank alongside all of screw thread helix.

14. The screw as recited in claim 1 wherein the screw thread helix has a helical back, wherein the screw thread ridge radially protrudes from the back, and wherein the back axially protrudes from the screw thread ridge towards the rear end of the shank.

15. The screw as recited in claim 1 wherein the screw thread ridge is free of any mating thread engagement.

16. The screw as recited in claim 1 wherein the shank has a rearwardly facing flank for axially engaging the screw thread helix.

17. The screw as recited in claim 1 wherein the screw thread helix has a helical back, wherein the screw thread ridge radially protrudes from the back.

18. The screw as recited in claim 1 further comprising a screw thread helix receiving groove winding around the longitudinal axis of the shank in the shank, the screw thread helix being arranged in the screw thread helix receiving groove.

* * * * *